April 27, 1937.  C. W. DUPUIS  2,078,724
LOCKING DEVICE
Filed Jan. 24, 1935
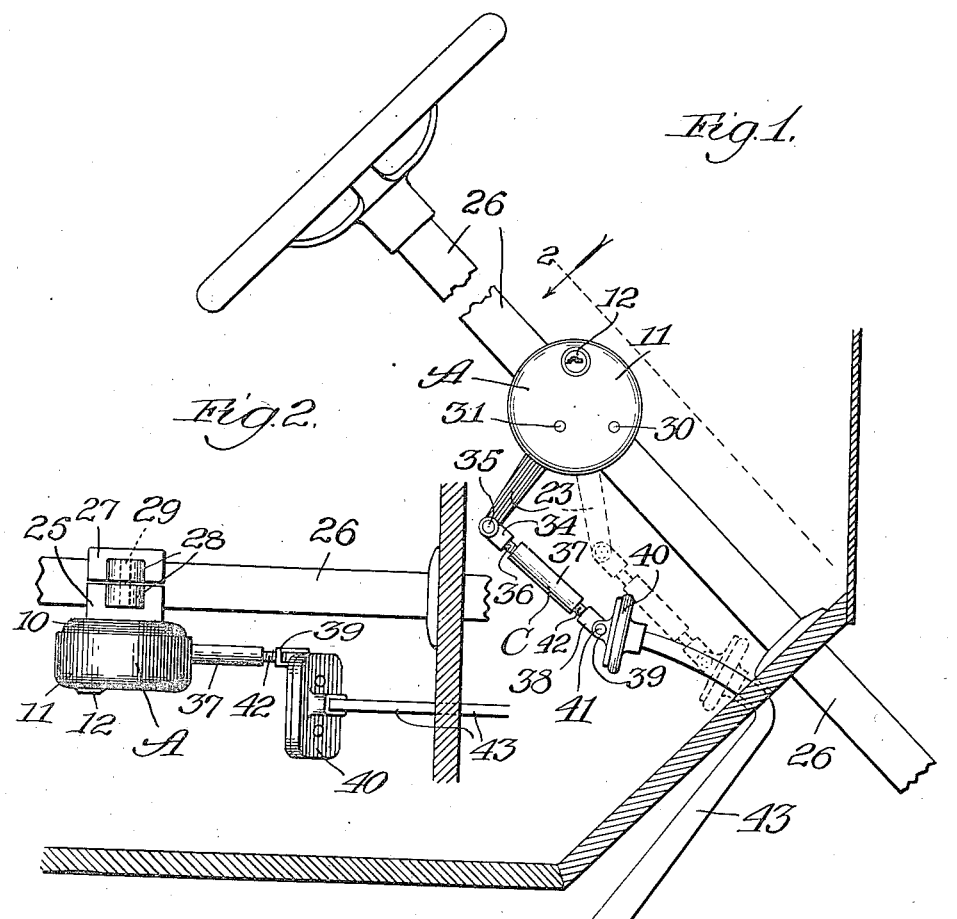
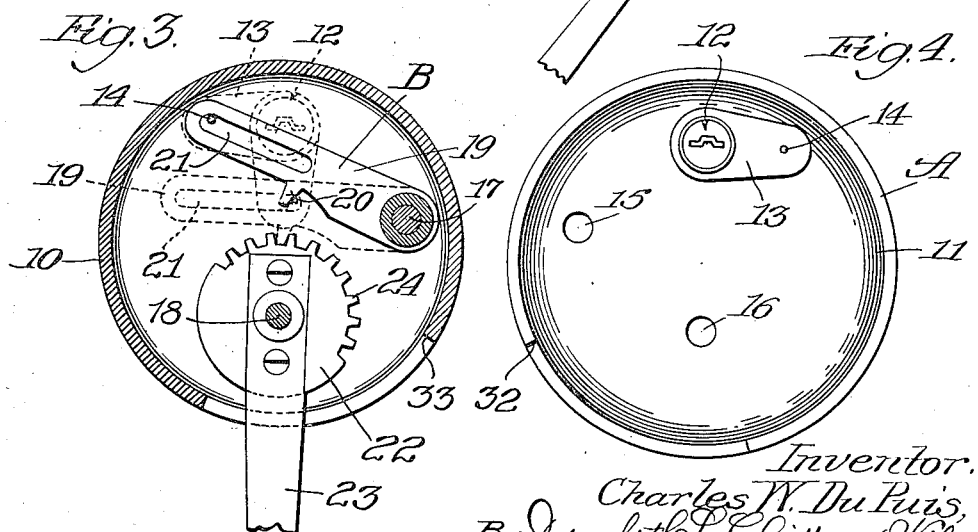
Inventor:
Charles W. DuPuis,
By Dyrenforth, Lee, Chritton & Wiles,
Attys.

Patented Apr. 27, 1937

2,078,724

UNITED STATES PATENT OFFICE 2,078,724

LOCKING DEVICE

Charles W. Dupuis, Chicago, Ill.

Application January 24, 1935, Serial No. 3,332

5 Claims. (Cl. 70—202)

This invention relates to a locking device and more particularly to a locking device for the brake of an automobile or other vehicle.

An object of the invention is to provide automatic mechanism for locking the brake of an automobile or other vehicle. A further object is to provide key-controlled mechanism for effecting the locking of a brake in locking position, or the locking of a driving member in inoperative position so as to prevent movement of the vehicle. Other specific objects and advantages will appear as the specification proceeds.

The invention is illustrated, in a preferred embodiment, by the accompanying drawing, in which—

Figure 1 is a side view in elevation of locking mechanism embodying my invention, the locking mechanism being shown applied to the steering wheel shaft of an automobile; Fig. 2, a plan view, the view being taken as indicated at line 2 of Fig. 1; Fig. 3, a broken view in elevation of the interior of one part of the lock casing; and Fig. 4, a similar interior view of the other side of the lock casing.

In the illustration given, A designates a lock casing; B, lock mechanism inside the casing; and C, connecting mechanism between the locking mechanism within the casing and the brake pedal.

The casing A comprises an inner part 10 telescopically received within the outer part 11. A key-controlled lock 12 extends through the wall 11 and is equipped on its inner side with a lever 13 secured to its barrel. The end of the lever 13 is provided with a pin 14. The casing 11 is provided with bolt openings 15 and 16 adapted to receive bolts 17 and 18. Pivotally mounted on bolt shank 17, as shown in Fig. 3, is a pawl member 19 provided with a depending tooth 20. The forward end of the pawl 19 is slotted at 21, the slot being adapted to slidingly receive the pin 14.

Pivotally mounted on shaft 18 is a ratchet gear 22 to which is rigidly secured a swing arm 23. The gear teeth 24 are adapted to mesh with the tooth 20 of pawl 19 when the pawl is in the lower position indicated by dotted lines in Fig. 3. The tooth 20 of pawl 19 is provided on its side toward the pivot 17 with an inclined or cam surface which causes the tooth 20 to slip out of engagement with teeth 24 as the depending link 23 is swung to the right as shown in Fig. 3. The other side of tooth 20 is straight and it engages teeth 24 to prevent movement of the member 23 toward the left, as shown in Fig. 3, when the member 13 is in the lower position shown in dotted lines in Fig. 3. In the lower position shown in dotted lines, the weight of the lever 19 normally urges tooth 20 toward gear teeth 24. When it is desired to raise lever 19 to bring tooth 20 out of engagement with gear teeth 24, a key is inserted through keyhole 12 to bring about a rotation of the barrel together with the lever 13.

Secured to the inner casing part 10 is an attachment block 25 provided centrally with a hollow recess permitting it to extend half way around the steering shaft tube 26. A free attachment block 27, which is similar to block 25, extends about the other half of the tube 26. The blocks 25 and 27 are provided with attachment ears 28 which are aligned on opposite sides of the tube 26. The aligned ears are clamped together by a pair of screws 29 threadedly engaging the ears. Preferably, the head of each screw is cut off to prevent removal of the attachment blocks.

As shown more clearly in Fig. 2, the inner casing 10 is telescopically received within the outer casing 11 and the two parts are held together by the bolts 17 and 18. The outer ends of the bolts 17 and 18 are riveted over to form heads 30 and 31, as shown more clearly in Fig. 1.

The casing parts 10 and 11 are provided with aligned slots 32 and 33, as shown more clearly in Figs. 3 and 4, said slots being aligned to permit the swinging movement of the arm 23.

The arm 23 is pivotally secured to elbow 34 by rivet 35. The elbow 34 is equipped with a threaded rod 36 received within the extension member 37. A similar elbow 38 is pivotally secured to an ear 39 on the brake pedal 40 by means of a rivet 41. The elbow 38 is also provided with a threaded shank 42 received within the interiorly threaded sleeve 37. The brake pedal 40 is connected through the angle member 43 with the usual form of brake mechanism (not shown).

The casing members 10 and 11 are preferably formed of case-hardened metal, and the various parts are so connected by rivets, etc. so as to prevent removal of the locking mechanism. Preferably, all of the exposed parts are of saw and drill resisting material.

In the operation of the device, when the key is turned so that the lever arm 13 is in the horizontal position shown in Fig. 4, the pawl 19 is held in raised position, as shown in Fig. 3, the tooth 20 being thus held out of engagement with the ratchet teeth 24. In this position, the ratchet gear 22 swings freely on the axis 18 so that the brake pedal 40 can be freely operated. When, however, the key is inserted and turned so as to swing the lever arm 13 downwardly to the position shown in dotted lines in Fig. 3, the tooth 20 of pawl 19 engages the ratchet teeth 24. As the brake pedal is urged forwardly one of teeth 24 will be urged against the cam surface of tooth 20 tending to raise pawl 19. Since pin 14 fits very loosely in the upper part of slot 21, and since lever 13 itself is loosely mounted, pawl 19 will then rise until the lower edge of slot 21 impinges pin 14 and play in the parts is taken up. This allows pawl 19 to rise sufficiently to cause disengagement of tooth 20 to allow forward movement of the brake pedal. The brake pedal may now be moved inwardly, the cam surface of tooth 20 ratcheting over teeth 24, but movement of the pedal in the opposite direction is prevented by engagement of tooth 20 with the teeth 24. When the brake pedal is pushed inwardly, as shown in dotted lines in Fig. 1, it is held in this position by the engagement between the pawl 19 and ratchet gear 22. The car is thus held in locked and braked position, and an unauthorized person is prevented from towing or driving away the car.

To free the brake again, the operator must insert the key within lock 12 and turn it so as to elevate the lever arm 13 to the horizontal position shown in Fig. 4. The engagement of pin 14 with slot 21 of pawl 19 causes the pawl 19 to be raised, thus disengaging tooth 20 from gear teeth 24. The brake pedal 40 is thus freed for operation.

It will be observed that the operation is automatic, the brake pedal locking itself when it is depressed, after the key has been turned to depress the lever arm 13.

With the brake depressed, the wheels are locked and if the motor should be started, it will automatically die when put into gear for movement. All of the locking parts are connected so that there are no separate pieces which might be lost by the operator.

While I have shown the locking mechanism applied to the brake of an automobile, it will be understood that it is applicable to other drive or auxiliary parts, whereby operation of the car can be prevented through the use of the locking mechanism.

The foregoing detailed description has been given for clearness of understanding only, and no unnecessary limitations should be understood therefrom, but the appended claims should be construed as broadly as permissible, in view of the prior art.

I claim:

1. In combination with the brake pedal of a vehicle, an arm pivotally secured thereto, and automatic means for locking said arm against movement in one direction only when said pedal is depressed.

2. In combination with the brake pedal of a car, a lock casing, automatic locking mechanism housed within said casing, and means pivotally secured to said pedal for connecting said locking mechanism and said brake pedal, said locking mechanism being operative for locking only when said pedal is depressed.

3. In combination with the brake pedal of an automobile, a lock casing secured to the steering shaft of the automobile, said casing being provided with a slotway, locking mechanism within said casing and equipped with a swing arm extending through said slotway, and connecting means pivotally connected to said swing arm and said brake pedal, said pedal being movable in one direction only when said locking mechanism is operative.

4. Automatic locking mechanism for a vehicle lever comprising: a connecting member pivotally connected to said lever, a casing, a ratchet gear rotatably mounted in said casing, a swing arm secured to said gear and pivotally connected to said connecting member, and a key-controlled pawl adapted to be moved into engagement with said ratchet gear.

5. Locking mechanism adapted to lock a vehicle lever in one position, comprising: a lock casing, a ratchet gear rotatably mounted therein, a pawl hingedly mounted in said casing, said pawl, when engaging said ratchet gear, permitting movement in one direction but not in the other, means for swinging said pawl into and out of engagement with said ratchet gear, a swing arm secured to said ratchet gear and extending through a slot with which said casing is provided, and means connecting said swing arm with said vehicle lever.

CHARLES W. DUPUIS.